May 28, 1963 M. C. DEPP 3,091,127
COMPENSATING MEANS FOR GYROMAGNETIC REFERENCE SYSTEMS
Filed March 27, 1959
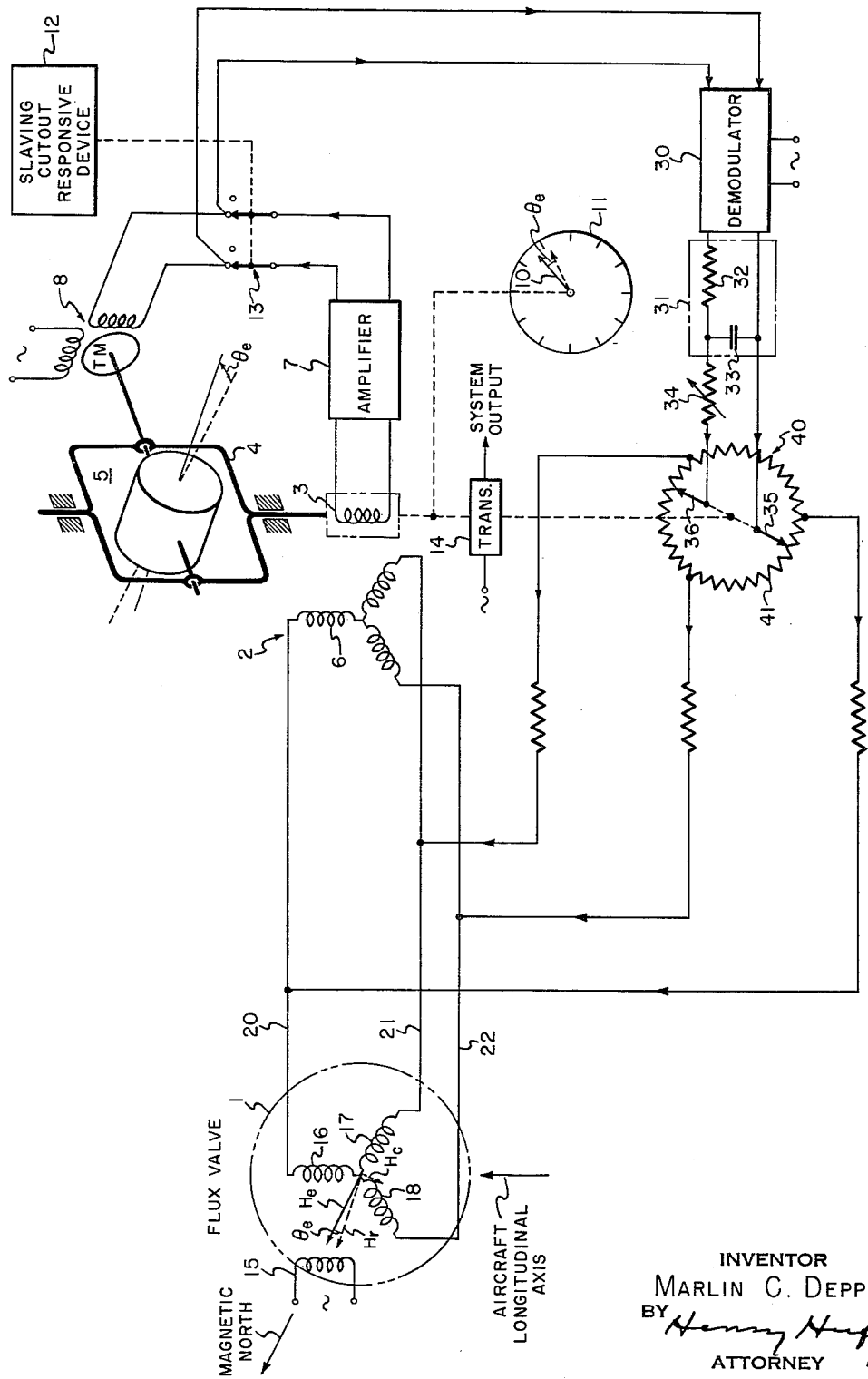
INVENTOR
MARLIN C. DEPP
BY
ATTORNEY

United States Patent Office 3,091,127
Patented May 28, 1963

3,091,127
COMPENSATING MEANS FOR GYROMAGNETIC REFERENCE SYSTEMS
Marlin C. Depp, Brightwaters, N.Y., assignor to Sperry Rand Corporation, Great Neck, N.Y., a corporation of Delaware
Filed Mar. 27, 1959, Ser. No. 802,530
9 Claims. (Cl. 74—5)

This invention relates to gyromagnetic reference systems wherein a directional gyroscope is slaved by a magnetic field sensitive reference device and particularly to improvements in systems of the aforementioned type to compensate for persistent misalignment between the reference direction provided by the magnetic reference device and the reference direction stabilized by the directional gyroscope.

Heretofore, a variety of gyromagnetic reference systems have been developed wherein a directional gyroscope is employed as a primary meridian indicator and is slaved to the magnetic meridian or to some predetermined azimuthal relation with respect to the meridian by a torque about its horizontal axis that is controlled from some form of magnetic field sensitive device such as a magnetic compass or a flux valve compass which is arranged to detect the horizontal component of the earth's magnetic field. In known magnetically slaved directional gyro compass systems, the accuracy of the magnetic heading measure or indication is adversely affected by the dynamic characteristics of the gryoscope and the errors due to the components of the signal transmission system which connect the magnetic compass to the directional gyro, the combination of which causes a misalignment known as gyro "hang-off" error.

The portion of the gyro hang-off error due to the dynamic characteristics of the gyro are caused by gyro drift. Mass unbalance of the gyro and unbalanced frictional torques at the gyro gimbals produce a real drift of the gyro which causes azimuthal rotation thereof. The gyro, being stable in inertial space, is also subject to apparent drifts which include drifts due to earth's rate and meridian convergence. The apparent drift due to earth's rate is equal to the earth's rotational velocity times the sine of the latitude of the craft. The apparent drift produced when the directional gyro is transported over the earth's surface is known as meridian convergence and this drift rate is proportional to the speed at which the gyro is transported, the sine of the heading angle and the tangent of the latitude.

In order to counteract the tendency of the gyro to drift, it is slaved in azimuth by means of a magnetic compass or a flux valve compass and signal transmission means to either the magnetic meridian or to a predetermined azimuthal relation with respect to the magnetic reference heading vector sensed by the compass. However, the components of the signal transmission means may also produce long term errors which, for purposes of convenience, will be considered in the following discussion as a drift error. For example, the slaving amplifier of the signal transmission means may be electrically unsymmetrical with respect to its null point thereby introducing a long term error into the system.

The gyromagnetic reference system constitutes a servo system in which the controlled variable, the azimuthal position of the gyro, responds to both the heading input signal from the compass and the disturbance inputs, i.e., real and apparent drifts. In a given instance, the indicated magnetic heading will hang-off from the true magnectic heading by an amount proportional to the total gyro drift and the slaving constant of the signal transmission system; the value of the steady state or persistent misalignment being referred to herein as the hang-off error.

The hang-off error due to real and apparent drifts of the gyro become more important as aircraft speeds are increased, particularly when it is realized that compass systems for high speed aircraft should have low slaving rates to minimize the effects of acceleration in causing heading indication errors. Although the real drift of present-day gyroscopes may be limited to plus or minus 2° per hour, the apparent drifts due to earth's rate and meridian convergence may easily total 30° per hour as speeds of aircraft exceed the speed of sound. For example, a 30° per hour drift in a gyromagnetic compass system having a slaving constant of 1° per minute per degree of error would result in a hang-off error of 0.5 degree which is a substantial error for a precision compass system. It is not feasible to increase the slaving constant of the system appreciably, for example, by increasing the gain of the slaving amplifier, because the directional gyro would then become unduly responsive to the oscillatory output from the compass.

It is a primary object of the present invention, therefore, to provide a heading reference system for navigable craft which provides an accurate heading reference measure.

It is another object of the present invention to provide a heading reference system which effectively eliminates the hang-off error with respect to the direction of the horizontal component of the earth's magnetic field.

It is a further object of the present invention to provide a gyromagnetic compass system which is more accurate and adaptable for modern, high speed aircraft.

The above objects are achieved by the gyromagnetic compass system of the present invention by obtaining a signal which is proportional to the persistent hang-off error from the output of the slaving amplifier and applying it as a smoothed D.C. signal having a magnitude proportional to said error signal to a resolving means. The resolving means is connected to supply D.C. currents to the secondary coils of the flux valve compass. The D.C. currents produce a magnetic vector at right angles to the magnetic vector created by the earth's magnetic field in a direction to compensate for the real and apparent drifts which cause the persistent error signal. In effect, a resultant magnetic vector is produced in the flux valve compass which compensates for the persistent error signal in order that, when it is applied through the signal transmission system to the directional gyro, the directional gyro is slaved to the desired azimuthal reference heading position.

The present invention will now be described with reference to the accompanying drawing which is a schematic representation of a typical slaved gyromagnetic compass system illustrating the compensation apparatus of the present invention.

A number of different types of compass systems operate in response to the direction of the earth's magnetic field by slaving a directional gyro and the apparatus of the present invention is applicable to any of them for compensating for asynchronism between the reference direction initially provided by the magnetic reference device and the reference direction stabilized by the directional gyro, i.e., the hang-off error. It is to be understood that the present invention is applied to the system illustrated primarily for purposes of example.

Referring to the drawing, and particularly to the upper portion thereof, there is illustrated a typical magnetically slaved directional gyro compass system of the type described in detail in U.S. Patent No. 2,357,319, issued September 5, 1944, to O. E. Esval et al., and entitled "Flux Valve Magnetic Compass." Generally, the system comprises a remote magnetic field sensitive device such as, for example, a flux valve 1, which will be hereinafter described in more detail, which supplies an electrical output signal representative of the direction or orientation of the longitudinal axis of the aircraft with respect to the direction of the horizontal component of the earth's magnetic field. A synchro control transformer 2, having its rotor 3 mechanically driven or otherwise positioned by the vertical gimbal 4 of a directional gyro 5, receives the output of the flux valve 1 in its stator 6 and any difference between the azimuthal position of the directional gyro 5 and the direction of the magnetic vector in the stator 6 results in an electrical signal output from the rotor 3. The output from rotor 3 is amplified in slaving amplifier 7 and applied to a torque motor 8 on the horizontal axis of the gyro 5 which will tend to precess the gyro 5 in a direction and an amount to maintain alignment between the azimuthal position of the gyro 5 and the direction of the earth's field as sensed by flux valve 1. A pointer 10, connected to rotate with the vertical gimbal 4 of directional gyro 5, may be read against a calibrated dial 11 to provide an indication of the heading of the craft. A slaving cutout responsive device 12, which may be, for example, a rate gyro, is connected to the ganged contact arms of normally closed switch 13. During turns of the aircraft, device 12 operate to open switch 13 to discontinue slaving. A signal transmitter 14 may be provided for supplying spaced stabilized magnetic heading data to utilization apparatus in the aircraft, such as, for example, heading repeaters, navigable computers, autopilots and the like.

The flux valve 1 may be of the type disclosed in U.S. Patents Nos. 2,383,460 and 2,383,461, issued August 28, 1945, and further disclosed in U.S. Patent No. 2,852,859, issued September 23, 1958. As shown, flux valve 1 has its primary winding 15 connected to be excited with 400 cycle single phase supply voltage which serves cyclically to vary the reluctance of the core material of the respective legs in order to generate output voltages in the secondary or pick-up windings 16, 17 and 18. The output of each winding is an 800 cycle alternating voltage proportional in amplitude to the magnitude of the horizontal component of the earth's magnetic field which lies substantially parallel to the axis of the respective pick-up winding. The flux valve 1 is preferably pendulously mounted in the wing of the aircraft remote from disturbing magnetic fields with output winding 16 parallel to the longitudinal axis of the craft. The secondary windings 16, 17 and 18 are preferably Y-connected and the respective output leads 20, 21 and 22 are connected with the corresponding windings of the stator 6 of the synchro control transformer 2.

In the operation of the conventional gyromagnetic compass system shown in the upper portion of the drawing, the direction and strength of the horizontal component of the earth's magnetic field, indicated by the solid line vector, $H_e$, is detected by the flux valve 1. The voltages in the pick-up windings 16, 17 and 18 induce currents that are applied to the stator 6 of control transformer 2. The induced currents produce a magnetic field in the stator 6 which vectorially has a direction and strength corresponding to that of the earth's magnetic field as sensed by flux valve. Any misalignment between the gyro spin axis and the direction of the magnetic vector in the stator 6 results in an error signal from the rotor 3 which is amplified in slaving amplifier 7. Preferably, the slaving amplifier 7 has a linear output characteristic over the range of operation under consideration in order that the effective slope for dynamic error inputs shall be the same as that for static error inputs. The amplified error signal passes through normally closed switch 13 to energize torque motor 8 which precesses the gyro 5 in azimuth in a direction which tends to maintain the gyro spin axis aligned with the direction of the earth's magnetic field as sensed by the flux valve 1. However, the amount which the gyro 5 precesses falls short of the desired amount by an amount proportional to the total gyro drift rate and the slaving constant of the compass system, and the errors due to the components of the signal transmission system, this amount being referred to as the persistent error signal. This results in a persistent misalignment or hang-off of the azimuthal position of the gyro with respect to that of the magnetic vector sensed by the flux valve 1 causing an erroneous heading indication on dial 11 and an erroneous output from transmitter 14. In the example cited above, the persistent error amounted to 0.5 degree.

The present invention provides a means for producing a compensating signal in accordance with the persistent error signal which is applied to effectively alter the magnetic vector sensed by the flux valve 1 to obtain a correct heading indication. To accomplish the desired objectives, the output of the slaving amplifier 7 is connected, for example, at the contacts of switch 13 to the input of a demodulator 30. The pulsating D.C. output of demodulator 30 is connected to an RC circuit 31 comprising a series resistor 32 and a shunt capacitor 33. The RC circuit 31 functions as a low pass filter with a relatively long time constant to filter out the higher frequency components thereof to effectively eliminate frequencies which would normally produce errors due to the dynamics of the flux valve. A suitable RC circuit for this purpose is one having, for example, a 100K resistor and a 200 microfarad condenser.

The D.C. voltage output of the RC circuit 31 is connected through an adjustable gain calibration resistor or attenuator 34 into a pair of diametrally disposed brushes 35 and 36 of D.C. resolver 40. The resolver 40 comprises the movable brushes 35 and 36 which cooperate with a continuous circular potentiometer 41, the latter having symmetrically spaced tap points spaced 120° apart. The movable brushes 35 and 36 of resolver 40 are mechanically or by servo means connected to the lower shaft of the vertical gimbal 4 of directional gyro 5 and disposed at right angles to the spin axis of directional gyro 5. The spaced taps on the potentiometer 41 are connected to supply D.C. voltage through isolation resistors to the secondary windings 16, 17 and 18 of flux valve 1 via leads 20, 21 and 22, respectively. The purpose of the resolver 40 is to resolve the direct currents in order to produce a magnetic vector within the flux valve 1 at right angles to the vector sensed by the flux valve due to the earth's magnetic field to compensate for the hang-off error in a manner to be more fully described.

In the operation of the over-all system shown in the drawing, when the gyro "hangs off," as explained previously, voltages which are a measure of the persistent hang-off error appear at the output of the rotor 3 of control transformer 2 and, at a higher level, at the output terminals of the slaving amplifier 7. In the embodiment of the invention shown, the output of the slaving amplifier 7 is demodulated in demodulator 30 to provide a pulsating D.C. having a magnitude and a polarity proportional to the amplitude and sense of the persistent error signal which is smoothed and filtered in RC circuit 31. By adjustment of resistor 34, the smoothed and filtered D.C. signal is attenuated to the proper magnitude. The attenuated or controlled compensating D.C. signal is resolved in resolver 40 in accordance with the position of brushes 35 and 36 and applied to the secondary windings 16, 17 and 18 of flux valve 1 to produce a magnetic vector, indicated by the small dotted vector, $H_c$, perpendicular to the magnetic vector, $H_e$, produced by the earth's magnetic field as sensed in flux valve 1. The compensating D.C. signal, which is proportional to the persistent error signal, applied to the flux valve generates a magnetic field therein which adds vectorially to the horizontal component of the earth's magnetic field detected by the flux valve to produce a magnetic field having a resultant vector, $H_r$, indicated in dotted lines. The resultant vector, $H_r$, in the plane of the flux valve is displaced from the earth's horizontal field vector, $H_e$, by an angle, $\theta_e$, equal to the persistent hang-off error of the system. The hang-off angle, $\theta_e$, has been exaggerated in the drawing for purposes of clarity.

Since the compensating D.C. signal is effectively a positive feedback signal, the shift in the magnetic field is in a direction to cause an increase in the magnitude of the voltage appearing at the rotor 3 of the control transformer 2 with the phase remaining constant. This increased voltage at the rotor 3, when amplified in amplifier 7 and applied to the torque motor 8, precesses the gyro 5 in azimuth until the gyro spin axis, as indicated in dotted lines, corresponds with the direction of the magnetic vector, $H_e$, thereby providing an accurate heading indication, as indicated in dotted lines, on dial 11 and a voltage at the output of transmitter 14 that is representative of the aircraft's heading.

It will be noted that the hang-off error, insofar as it effects the visual and electrical outputs of the system, i.e., dial 11 and transmitter 14, is thus effectively eliminated. However, it will be further noted that the voltage at the output of rotor 3 of control transformer 2 has not decreased to zero but is maintained at the original hang-off value. Hence, the steady state conditions of all the system components with the addition of the present invention will be identical to the conditions existing before the addition of the present invention with the exception that now the flux valve 1 detects a resultant magnetic field shifted from the earth's magnetic field by an amount necessary to compensate for the hang-off error of the gyro, i.e., hang-off angle, $\theta_e$, which results in an accurate heading indication on dial 11.

The slaving cutout responsive device 12 is provided both for the normal function of cutting out slaving and erection during turns and also for the purpose of preventing errors developing in the compensating signal during turns. Under normal steady state conditions, the output of the RC circuit 31 will be a steady D.C. or a slowly changing D.C. in response to long term drift and other long term errors.

In the preferred embodiment of the invention disclosed, it will be noted that for purposes of convenience, the rotor 3 of control transformer 2 and the brushes 35 and 36 of resolver 40 are connected to the lower shaft of vertical gimbal 4 of directional gyro 5. It will be appreciated that other arrangements may also be desirable, for example, as shown in U.S. Patent No. 2,898,690, filed January 5, 1956, issued August 11, 1959, entitled "Quick Setting Means for Gyromagnetic Compass," of W. P. Colistra, where the corresponding rotor of the control transformer is connected to the heading indicater shaft which is remote from the directional gyro. In that type of system, the brushes 35 and 36 of resolver 40 would also preferably be connected to the heading indicator shaft rather than the vertical gimbal of the corresponding directional gyro.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A gyromagnetic compass system for navigable craft comprising a directional gyro subject to continuous azimuthal rotation, a magnetic compass responsive to the earth's magnetic field for sensing a magnetic vector having a direction and a magnitude representative of the direction and strength of said field, signal transmission means coupled between said compass and said gyro for supplying a continuous error signal tending to maintain said gyro in a predetermined azimuthal relation with respect to the earth's magnetic vector sensed by said compass whereby the continuous azimuthal rotation of said gyro causes asynchronism of said azimuthal relation which is not entirely corrected by said continuous errer signal that tends to oppose said rotation, means responsive to said continuous error signal for providing a compensating signal in accordance therewith, and means responsive to said compensating signal and coupled to said signal transmission means for effectively altering the magnetic vector sensed by said compass in accordance with said compensating signal in a direction to increase said error signal whereby said predetermined azimuthal relation is effectively maintained with respect to the earth's magnetic vector.

2. A gyromagnetic compass system for navigable craft comprising a directional gyro subject to continuous azimuthal drift for producing a gyroscopic reference heading measure, a magnetic field detector responsive to the earth's magnetic field for producing a magnetic reference heading measure, signal transmission means responsive to said magnetic reference heading measure and connected to provide an output signal representative of a persistent difference between the azimuthal relation of said reference heading measures for slaving said directional gyro in a direction which tends to maintain the gyroscopic reference heading measure in a desired azimuthal relation with respect to the magnetic reference heading measure, means responsive to the output signal of said signal transmission means for providing a compensating signal in accordance with the persistent difference between said azimuthal relation of said reference heading measures, and means responsive to said compensating signal and connected to said signal transmission means for effectively altering the magnetic reference heading measure in accordance with said compensating signal in a direction to increase said error signal whereby said desired azimuthal relation of said gyro with said earth's magnetic field is maintained.

3. A gyromagnetic compass system for navigable craft comprising a directional gyro subject to continuous azimuthal rotation, a magnetic field detector responsive to the earth's magnetic field, signal transmission means coupled therebetween for supplying an output signal representative of a persistent error between the azimuthal position of said gyro and that of the earth's magnetic vector sensed by said magnetic feld detector tending to maintain the directional gyro in a desired azimuthal relation to the earth's magnetic vector sensed by said magnetic field detector whereby the continuous azimuthal rotation of the gyro causes an undesired asynchronism of said azimuthal relation which is not entirely corrected by said persistent error signal that tends to oppose said rotation, means responsive to the output signal of said signal transmission means for producing a compensating signal in accordance with the persistent asynchronism of said gyro and said vector, and resolving means responsive to said compensating signal and coupled to said signal transmission means for effectively altering the magnetic vector defined by said detector in a direction to increase said error signal to effectively compensate for said undesired asynchronism with respect to the earth's magnetic vector.

4. A gyromagnetic compass system for navigable craft comprising a directional gyro subject to continuous azimuthal drift, a magnetic field detector responsive to the earth's magnetic field, signal transmission means coupled therebetween for providing an A.C. output signal representative of a persistent error between the azimuthal position of the directional gyro and the earth's magnetic vector sensed by said magnetic field detector tending to maintain the gyro in a desired azimuthal relation to the earth's magnetic vector sensed by the detector whereby the continuous azimuthal drift of the gyro causes an undesired asynchronism of said azimuthal relation which is not entirely corrected by said persistent A.C. error signal having an amplitude and a sense that tends to oppose said drift, means responsive to said error signal for providing a compensating D.C. signal having a magnitude and a polarity proportional to the amplitude and sense of said error signal, and resolving means responsive to the compensating signal and to the azimuthal position of the gyro and coupled to said detector for effectively altering said magnetic vector in a direction to increase said error signal to effectively compensate for said undesired asynchronism with respect to the earth's magnetic vector.

5. A gyromagnetic compass system for navigable craft comprising a directional gyro subject to continuous azimuthal drift, a magnetic compass responsive to the horizontal component of the earth's magnetic field for defining a magnetic vector having a direction and a magnitude representative of the direction and strength of said component, signal transmission means coupled therebetween for providing an A.C. output signal representative of a persistent error between the azimuthal position of the directional gyro and the earth's magnetic vector sensed by said magnetic field detector tending to maintain the gyro in a desired azimuthal relation to said earth's magnetic vector whereby the drift of the gyro causes an undesired asynchronism of said azimuthal relation which is not entirely corrected by said persistent A.C. error signal having an amplitude and a sense that tends to oppose said drift, means responsive to said error signal for providing a pulsating D.C. signal having a magnitude and a polarity proportional to the amplitude and sense of said error signal, smoothing and filtering means responsive to said pulsating D.C. signal for producing a smoothed and filtered D.C. signal, adjustable attenuating means responsive to said smoothed and filtered D.C. signal for providing an attenuated D.C. signal, and resolving means responsive to said attenuated D.C. signal and coupled to said magnetic compass for producing a magnetic vector therein perpendicular to the magnetic vector resulting from the earth's magnetic field and having a magnitude whereby the resultant vector sensed by said magnetic compass is displaced by an amount which effectively compensates for said undesired asynchronism with respect to the earth's magnetic vector.

6. A system of the character described in claim 5 wherein said resolver has rotor and stator portions, the rotor portion thereof being repsonsive to the azimuthal rotation of said gyro and the stator portion thereof being mounted on the craft.

7. A system of the character described in claim 6 wherein said magnetic compass has a plurality of secondary windings, said stator portion of the resolver comprising a continuous circular potentiometer having taps thereon spaced 120° apart, said taps being connected to the respective secondary windings of the magnetic compass and said rotor portion comprising a pair of diametrically disposed brushes connected to be maintained perpendicular to the spin axis of said gyro and responsive to the attenuated D.C. signal, said brushes being cooperative with said circular potentiometer.

8. A system of the character described in claim 5 wherein said smoothing and filtering means comprises an RC low pass filter circuit having a long time constant.

9. A system of the character described in claim 5 including slaving cutout responsive means for rendering said persistent error signal ineffective when the craft is subjected to accelerations exceeding a predetermined magnitude.

References Cited in the file of this patent

UNITED STATES PATENTS

| | | |
|---|---|---|
| 2,331,617 | Moore | Oct. 12, 1943 |
| 2,357,319 | Esval et al. | Sept. 5, 1944 |
| 2,361,790 | Noxon | Oct. 31, 1944 |
| 2,412,614 | Haskins | Dec. 17, 1946 |
| 2,415,813 | Curry et al. | Feb. 18, 1947 |
| 2,451,230 | Lundberg | Oct. 12, 1948 |
| 2,561,367 | Haskins | July 24, 1951 |
| 2,574,471 | Fragola | Nov. 13, 1951 |
| 2,852,859 | Depp | Sept. 23, 1958 |
| 2,887,873 | Halpern | May 26, 1959 |
| 2,959,866 | Seaman | Nov. 15, 1960 |